United States Patent [19]

Yohda et al.

[11] Patent Number: 4,890,379
[45] Date of Patent: Jan. 2, 1990

[54] METHOD FOR MANUFACTURING MAGNETIC HEAD

[75] Inventors: Hiroshi Yohda, Hirakata; Ken Takahashi, Osaka; Eisuke Sawai; Syunsaku Muraoka, both of Hirakata; Keita Ihara, Katano, all of Japan

[73] Assignee: Matsushita Electric Industrial Co., Ltd., Osaka, Japan

[21] Appl. No.: 278,172

[22] Filed: Dec. 1, 1988

[30] Foreign Application Priority Data

Dec. 4, 1987 [JP] Japan .................................. 62-307868

[51] Int. Cl.$^4$ ............................................... G11B 5/42
[52] U.S. Cl. ....................................... 29/603; 360/123
[58] Field of Search .................. 29/603; 360/123, 124, 360/125

[56] References Cited

FOREIGN PATENT DOCUMENTS 0046408 2/1987 Japan ..................................... 29/603

Primary Examiner—Carl E. Hall
Attorney, Agent, or Firm—Wenderoth, Lind & Ponack

[57] ABSTRACT

A method of manufacturing a magnetic head includes fabricating a magnetic block having a lamination of magnetic alloy films and nonmagnetic substrates, and cutting the magnetic block into two bars to obtain magnetic core halves. A nonmagnetic film is formed on a surface of each of the core halves. The core halves are joined by adjoining the surfaces having the nonmagnetic film and then heating the thus adjoined core halves. Additionally, a magnetic field is applied rotating in a plane parallel to a plane of the magnetic alloy films. The joined core halves is then cut into a specified width, and a wire-winding window is machined therein.

20 Claims, 6 Drawing Sheets

FIG. IA
PRIOR ART
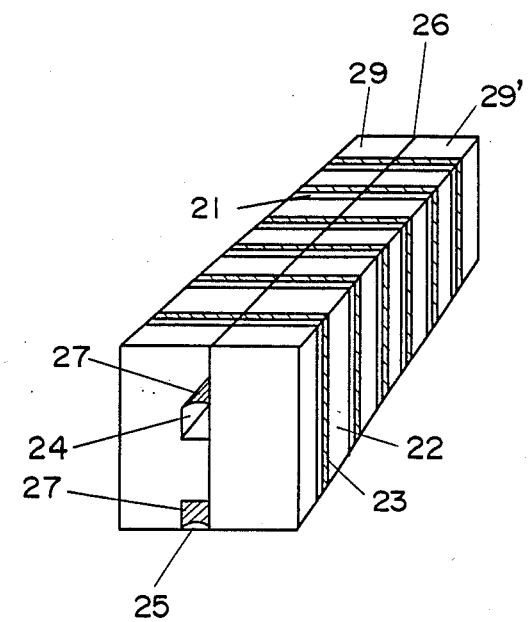
FIG. IB
PRIOR ART
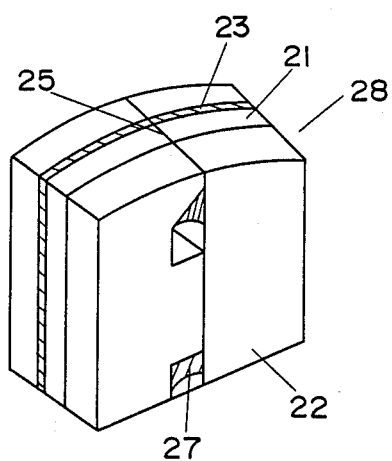

$\mu x > \mu y$  $\mu x < \mu y$

METHOD FOR MANUFACTURING MAGNETIC HEAD

BACKGROUND OF THE INVENTION

This invention relates to a method for manufacturing a magnetic head which is suitable for high density recording.

In conventional ferrite heads, to cope with an increase in the coerciveness of the magnetic recording medium so as to enhance the recording density to increase the of playing time video tape recorder or the like, it is difficult to magnetize sufficiently to a back surface of a magnetic layer. Accordingly, a new magnetic head is developed by disposing a high-magnetization magnetic alloy such as amorphous magnetic alloy, at least in the vicinity of a magnetic gap. An example of a maunfacturing method of such a ring-shaped magnetic head is explained referring to FIGS. 1A; 1B. A plurality of nonmagnetic substrates 22 having a magnetic alloy 23 formed on one side are laminated by way of an adhesive glass 21, and this block is cut in rectangular strips, and a winding window 24 and a glass sump groove 25 are formed on the gap surface, and a nonmagnetic gap film is formed, and by fusing the low melting point glass 27 in sump groove 25 and winding window 24, gapped bars 29, 29' joining two core halves are composed. Sequentially, the gapped bars are cut into a specified core width to obtain head chips 28, and by polishing the tape sliding surface, a magnetic head as shown in FIG. 1B is obtained. Incidentially, in the case of an amorphous magnetic alloy formed by sputtering or similar method, it is necessary to anneal at a high temperature in order to obtain favorable magnetic characteristics. In the case of an amorphous magnetic alloy of which crystallization temperature Tx is higher than the curie temperature Tc, magnetization vanishes at a temperature over Tc. Therefore, when the temperature of the glass bonding during the head fabrication process is selected somewhere between Tc and Tx, the same effect of annealing is obtained at the same time without actually annealing. Generally, however, since the Tx is lower than the Tc in the high-magnetization amorphous magnetic alloy, if a temperature lower than Tx is selected, it is less than Tc, and magnetization exists at the annealing temperature, and it is necessary to anneal while applying a rotary magnetic field or stationary magnetic field in order to avoid unnecessary magnetic anisotropy. This application of magnetic field is needed in the majority of the head manufacturing processes.

Annealing in the magnetic field does not matter in the case of amorphous magnetic alloy on a large rectangular substrate after sputtering, but in the case of a gapped bar with winding groove processing, since the demagnetizing factor differs depending on the shape of the object to be annealed, unnecessary magnetic anisotropy may be left over if the intensity of the applied magnetic field is insufficient. Yet, even when the intensity of the applied magnetic field is sufficiently large, if the demagnetizing factor differs depending on the direction of the magnetic field, the rotation of the magnetization of the magnetic alloy when placed in the rotary magnetic field is not uniform, and a magnetic anisotropy may be left over. FIG. 2 shows the mode of magnetization at point A in a magnetic core near the magnetic gap when a rotary magnetic field is applied in the film surface of the head with a film thickness of 40 μm. In spite of isotropic application of the magnetic field, the direction of magnetization is inclined in the direction of the smaller demagnetizing factor. Especially in the vicinity of the winding window, an anisotropy tends to be formed in the direction along the shape of the window due to the effect of the magnetic charge generated at the end surface of the window. Therefore, when a magnetic head of such shape is annealed in a rotary magnetic field, the magnetic core in the vicinity of the magnetic gap at the winding window side may come to have a magnetic anisotropy in the direction along the winding window. Meanwhile, when the anisotropy of the magnetic core is defined parallel (FIG. 3A) or perpendicular (FIG. 3B) to the magnetic gap face as shown in FIG. 3, leakage of the magnetic flux in the magnetic gap is smaller in the head having a parallel anisotropy to the magnetic gap, but in the head annealed in rotary magnetic field as mentioned above, the anisotropy of the magnetic core in the vicinity of the gap surface is closer to the direction perpendicular to the magnetic gap surface, and it is expected that favorable characteristic may not be obtained. In order to obtain a further preferable high frequency characteristic, when a uniaxial anisotropy is applied by annealing in a stationary magnetic field, similar problems may occur due to the difference in the demagnetizing factor depending on the direction of applied magnetic field.

SUMMARY OF THE INVENTION

To solve the above-discussed problems, the present invention is intended to manufacture a magnetic head by processing the winding window after joining plural magnetic core halves of which at least gap vicinity is made of magnetic alloy, with nonmagnetic gap material being inserted, said joining process being effected in a magnetic field.

By processing the winding window after annealing by applying a magnetic field at the same time when forming the magnetic gap, the magnetic core will not be provided with an unintended magnetic anisotropy due to the effects of the head shape or magnetic charge occurring at the end face of the winding window at the time of annealing, so that a head having excellent characteristics may be obtained.

While the novel features of the invention are set forth in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 1A, 1B are perspective views for explaining the conventional manufacturing process of magnetic head;

DETAILED DESCRIPTION OF THE PREFERRED EMBODIMENT

Figure 2:
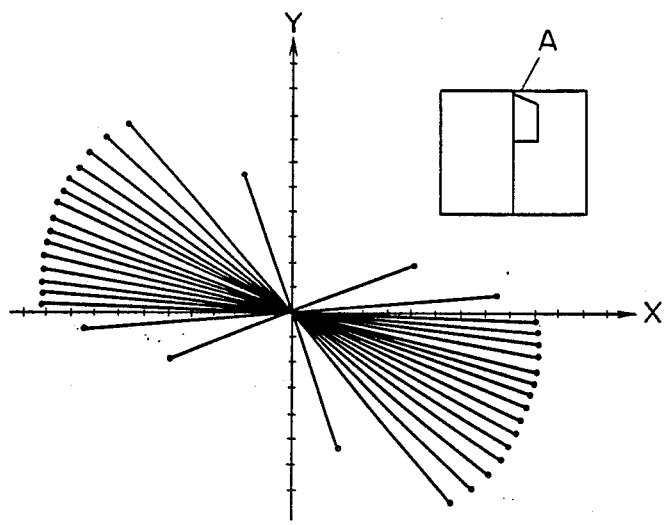
FIG. 2 is illustration for explaining the changes in the magnetization near the gap.
Figures 3A, 3B:
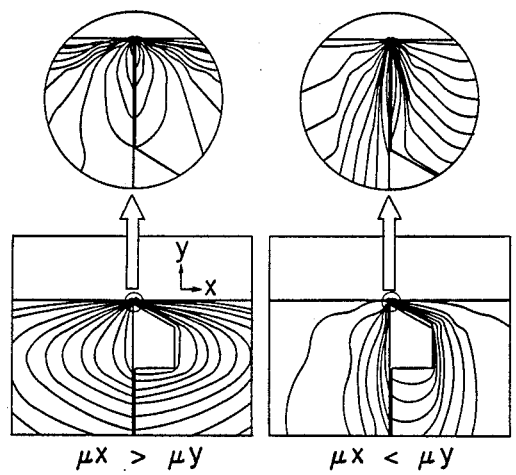
FIGS. 3A, 3B are illustrations for explaining the difference in the head characteristic due to difference in the magnetic anisotropy.
Figure 4A:
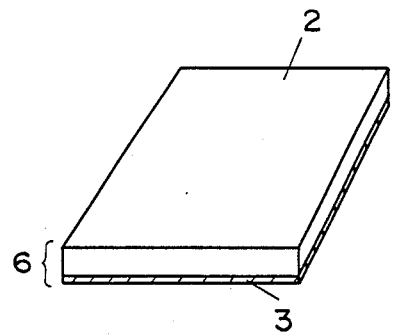
FIGS. 4A to 4G are perspective views for showing the manufacturing method of a magnetic head according to one of the embodiments of the invention.
Figure 4B:
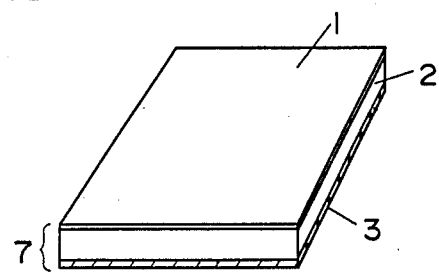
Figure 4C:
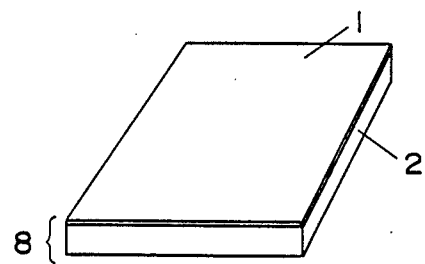
Figure 4D:
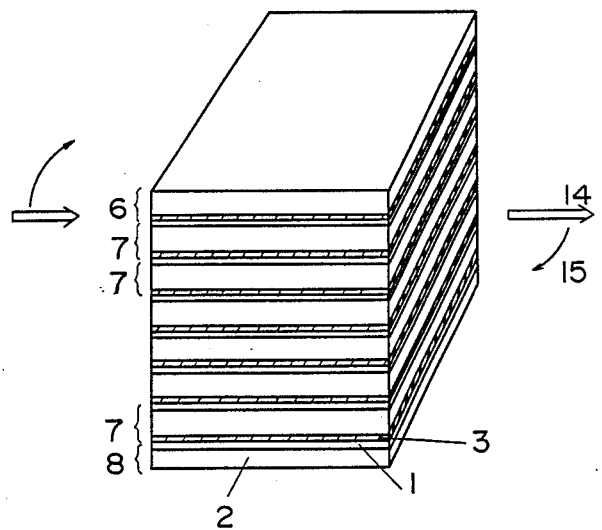
Figure 4E:
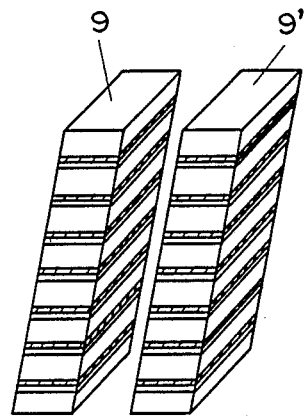
Figure 4F:
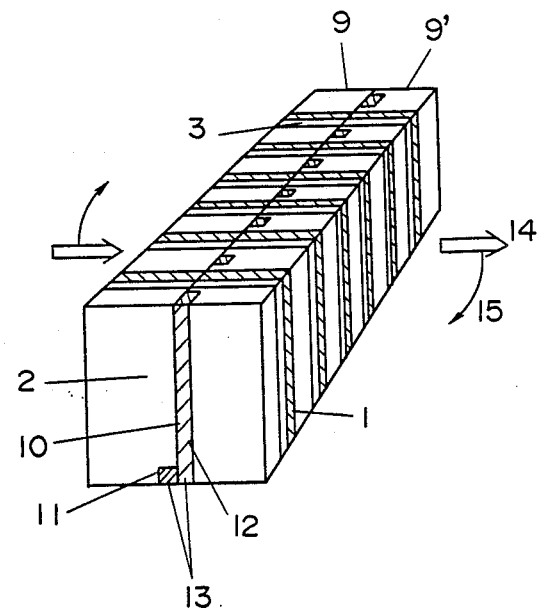
Figure 4G:
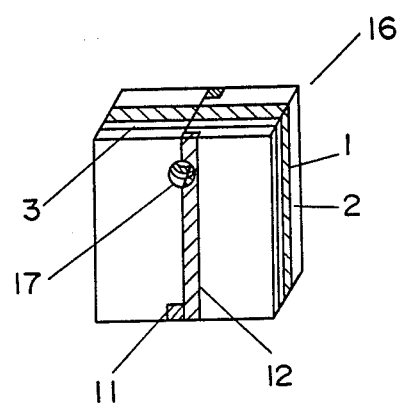
Figure 5:
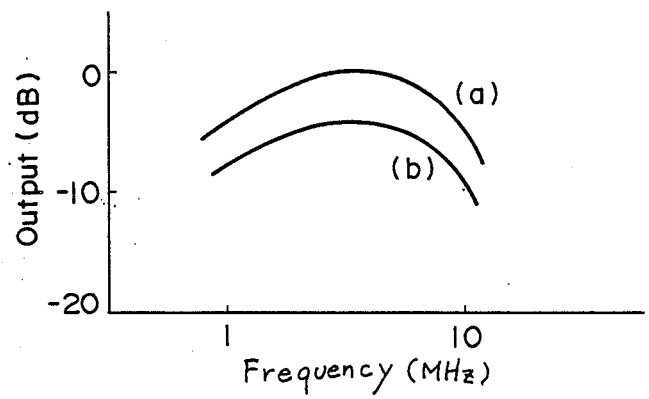
FIG. 5 is a characteristic diagram of the same head.

Referring now to FIGS. 4A through 4G, a first embodiment of the invention is described below. A first substrate 6 having an adhesive glass 3 formed on one side of a nonmagnetic substrate 2 such as calcium titanate, a second substrate 7 having a magnetic alloy 1 such as CoNbZr amorphous magnetic alloy formed on one side of a nonmagnetic substrate 2 and an adhesive glass 3 on the other side, and a third substrate 8 having a magnetic alloy 1 formed on one side of a nonmagnetic substrate 2 are fabricated (FIGS. 4A to 4C). Next, as shown in FIG. 4D, several laminates of the second substrate 7 are sandwiched between the first substrate 6 and third substrate 8. The assembly is heated to 460° C. while applying a magnetic field 14 of 400 Oe rotating in the direction of the arrow 15 inside the magnetic alloy to fuse the adhesive glass 3, and the substrates are thereby adhered to form a laminate block. This laminate block is then cut in rectangular pieces, and a pair of core halves 9, 9' as shown in FIG. 4E are fabricated. Then, as shown in FIG. 4F, glass sump grooves 11, 12 are provided in the magnetic gap faces 10 of the core halves 9, 9', and are filled with low melting point glass 13. Then the magnetic gap face 10 is ground smoothly, and a nonmagnetic layer of $SiO_2$ and low melting point glass having a thickness corresponding to the gap length is formed by sputtering or a similar method. The two core halves 9, 9' are held in confronting positions by the magnetic alloy 1, and they are heated to 460° C. while a rotary magnetic field 14 is being applied, and the low melting point glass in the gap face 10 and glass ump grooves 11, 12 are fused to join the two core halves to thereby compose a gapped bar. This gapped bar is cut in a specified core width to obtain a head chip 16. Afterwards, a winding window 17 is processed, and the tape sliding surface is ground, and a magnetic head as shown in FIG. 4G is obtained. In this case, various methods are possible for processing the winding window, such as the method of evaporating the object by laser, the ultrasonic processing method using polishing fluid, and sandblasting method of blowing polishing powder at high speed. For example, by converging YAG laser of 150 mW into 5 $\mu$m spot and emitting to the head, a winding hole of 300 $\mu$m in diameter may be opened in 3 minutes. FIG. 5 compares the characteristics between the head of this invention (a) and the head of the prior art (b). At 5MHz, a large output of over 4 dB is obtained.

Figure 6:
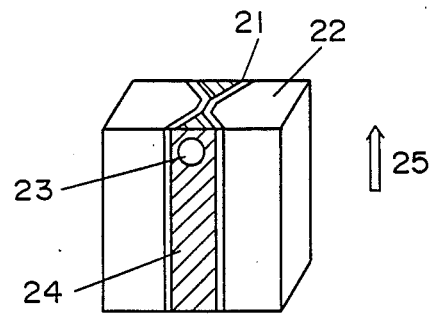
FIG. 6 is a perspective view showing a head in other embodiment of the invention.

The method for fabricating magnetic head of this invention is also effective when fabricating a head of the MIG (metal in gap) type as shown in FIG. 6. A magnetic alloy 21 is formed near the gap held by MnZn ferrite 22, and a head is manufactured by adhering with low melting point glass 24. In this case, when a magnetic field 25 is applied parallel to the magnetic gap face when forming the magnetic gap, an anisotropy is provided parallel to the magnetic gap face, so that a favorable characteristic may be obtained. In this case, by processing the winding window 23 after forming the magnetic gap, the orientation of the magnetic alloy 21 near the magnetic gap will not be disturbed by the effect of the demagnetization field generated at the end surface of the winding window.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

We claim:

1. A method of manufacturing a magnetic head comprising:
   joining plural magnetic core halves with a nonmagnetic gap material formed therebetween, each of said plural magnetic core halves comprising a magnetic alloy; said joining including heat treatment in a magnetic field; and then
   machining a wire-wiinding window into the thus joined plural magnetic core havles.

2. A method of manufacturing a magnetic head as recited in claim 1, wherein said joining step includes:
   fabricating a magnetic block having a lamination of magnetic alloy films and nonmagnetic substrates;
   cutting said magnetic block into at least two substantiallky rectangular solid bars to thereby obtain plural magnetic core halves;
   forming a nonmagnetic film on at least one surface of each of said plural magnetic core halves;
   adjoining surfaces having said nonmagnetic film thereon of two of said plural magnetic core halves;
   adhering the thus ajoined surfaces of said two magnetic core halves by heating said two magnetic core halves to thereby obtain said joined plural magnetic core halves by fusing of said nonmagnetic film of said adjoined surfaces, while simultaneously applying a magnetic field to said two magnetic core halves rotating in a plane parallel to a plane of said magnetic alloy films.

3. A method of manufacturing a magnetic head as recited in claim 2, wherein said joining step further includes cutting said joined magnetic core halves into a specified core width.

4. A method of manufacturing a magnetic head as recited in claim 1, wherein said joining step includes:
   forming a magnetic alloy on at least one surface of each of a pair of ferrite bars to thereby obtain said plural magnetic core halves;
   forming a nonmagnetic film on said magnetic alloy of each of said pair of ferrite bars;
   adjoining surfaces having said nonmagnetic film of said pair of ferrite bars;
   adhering the thus adjoined surface of said pair of ferrite bars by heating sad pair of ferrite bars to thereby obtain said joined plural magnetic core halves by fusing of said nonmagnetic film of said adjoined surfaces, while simultaneously applying a magnetic field to said pair of ferrite bars in a plane parallel to a plane of said adjoined surfaces.

5. A method of manufacturing a magnetic head as recited in claim 4, wherein said joining step further includes cutting said joined plural magnetic halves into a specified core width.

6. A method of manufacturing a magnetic head as recited in claim 1, wherein said machining step includes evaporating a portion of said joined plural magnetic core halves using a laser device.

7. A method of manufacturing a magnetic head as recited in claim 2, wherein said machining step includes evaporating a portion of said joined plural magnetic core halves using a laser device.

8. A method of manufacturing a magnetic head as recited in claim 3, wherein said machining step includes evaporating a portion of said joined plural magnetic core halves using a laser device.

9. A method of manufacturing a magnetic head as recited in claim 4, wherein said machining step includes evaporating a portion of said joined plural magnetic core halves using a laser device.

10. A method of manufacturing a magnetic head as recited in claim 5, wherein said machining step includes evaporating a portion of said joined plural magnetic core halves using a laser device.

11. A method of manufacturing a magnetic head as recited in claim 1, wherein said machining step includes subjecting a portion of said joined plural magnetic core halves to ultrasonic processing using a polishing fluid.

12. A method of manufacturing a magnetic head as recited in claim 2, wherein said machining step includes subjecting a portion of said joined plural magnetic core halves to ultrasonic processing using a polishing fluid.

13. A method of manufacturing a magnetic head as recited in claim 3, wherein said machining step includes subjecting a portion of said joined plural magnetic core halves to ultrasonic processing using a polishing fluid.

14. A method of manufacturing a magnetic head as recited in claim 4, wherein said machining step includes subjecting a portion of said joined plural magnetic core halves to ultrasonic processing using a polishing fluid.

15. A method of manufacturing a magnetic head as recited in claim 5, wherein said machining step includes subjecting a portion of said joined plural magnetic core halves to ultrasonic processing using a polishing fluid.

16. A method of manufacturing a mangetic head as recited in claim 1, wherein said machining step includes sand-blasting a portion of said joined plural magnetic halves using a blowing polishing powder.

17. A method of manufacturing a magnetic head as recited in claim 2, wherein said machining step includes sand-blasting a portion of said joined plural magnetic halves using a blowing polishing powder.

18. A method of manufacturing a magnetic head as recited in claim 3, wherein said machining step includes sand-blasting a portion of said joined plural magnetic halves using a blowing polishing powder.

19. A method of manufacturing a magnetic head as recited in claim 4, wherein said machining step includes sand-blasting a portion of said joined plural magnetic halves using a blowing polishing powder.

20. A method of manufacturing a magnetic head as recited in claim 5, wherein said machining step includes sand-blasting a portion of said joined plural magnetic halves using a blowing polishing powder.

* * * * *